(12) United States Patent
Adelmann, Jr.

(10) Patent No.: US 9,631,690 B2
(45) Date of Patent: Apr. 25, 2017

(54) ADJUSTABLE PROTECTION ELEMENT FOR USE WITH LIFTS AND HOISTS

(71) Applicant: Joseph A. Adelmann, Owatonna, MN (US)

(72) Inventor: Joseph A. Adelmann, Jr., Owatonna, MN (US)

( * ) Notice: Subject to any disclaimer, the term of this patent is extended or adjusted under 35 U.S.C. 154(b) by 240 days.

(21) Appl. No.: 14/617,010

(22) Filed: Feb. 9, 2015

(65) Prior Publication Data

US 2016/0230828 A1 Aug. 11, 2016

(51) Int. Cl.
*B32B 3/06* (2006.01)
*F16F 1/373* (2006.01)
*E04H 6/00* (2006.01)

(52) U.S. Cl.
CPC .............. *F16F 1/373* (2013.01); *E04H 6/00* (2013.01)

(58) Field of Classification Search
CPC ....................... Y10T 428/24008; A47B 95/043
See application file for complete search history.

(56) References Cited

U.S. PATENT DOCUMENTS

| | | |
|---|---|---|
| 3,110,466 A | 11/1963 | O'Sullivan |
| 3,221,907 A | 12/1965 | O'Sullivan |
| 4,307,985 A | 12/1981 | Desprez et al. |
| 4,869,634 A | 9/1989 | Carter |
| 4,988,083 A * | 1/1991 | Bradley ............... B65D 81/056 114/219 |
| 5,116,182 A | 5/1992 | Lin |
| 5,322,143 A | 6/1994 | Curran |
| 5,487,636 A | 1/1996 | Mkrtchyan |
| 5,549,938 A * | 8/1996 | Nesbitt ..................... F41H 3/00 296/191 |
| 6,044,601 A * | 4/2000 | Chmela ................. E04F 19/028 248/345.1 |
| 6,619,620 B1 | 9/2003 | Carter |
| 7,014,012 B2 | 3/2006 | Baker |
| 7,726,247 B2 | 6/2010 | Neland |
| 8,182,895 B2 * | 5/2012 | Myler ...................... B32B 5/32 248/345.1 |
| 8,256,577 B2 | 9/2012 | Kritzer |

* cited by examiner

*Primary Examiner* — Alexander Thomas
(74) *Attorney, Agent, or Firm* — Mark A. Litman & Associates, P.A.

(57) ABSTRACT

A protective device is positioned on poles in vehicle lifts or hoists. The device has:
two arms having an outer surface and an inner surface;
each inner surface having a magnetic layer;
inner surfaces of the two arms forming an interior angle between 30 degrees and 150 degrees;
outer surfaces of the arms forming an exterior angle of between 330 degrees and 210 degrees; and
the external angle supporting a cushioning element comprising an elastomeric, compressive tube.

16 Claims, 5 Drawing Sheets

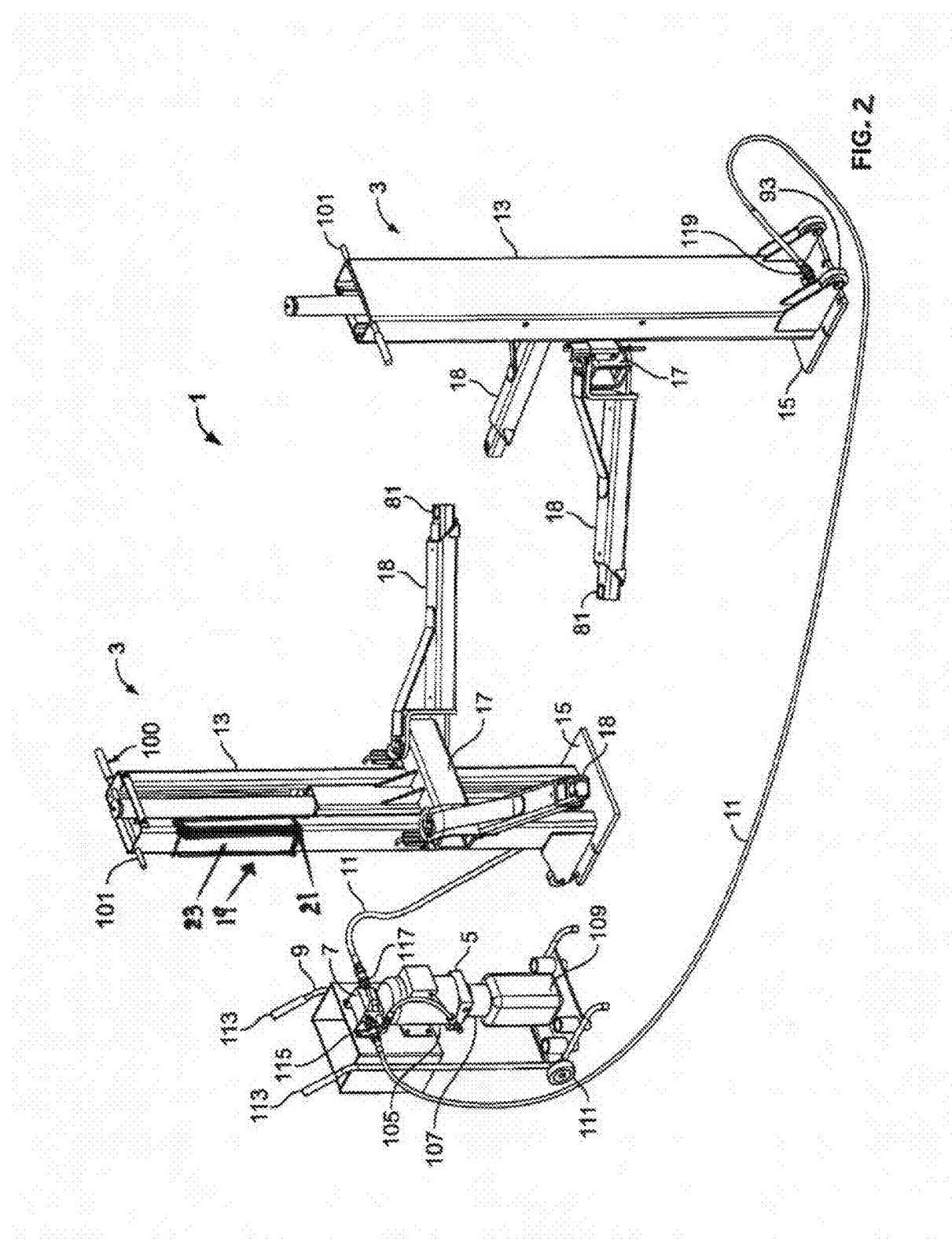

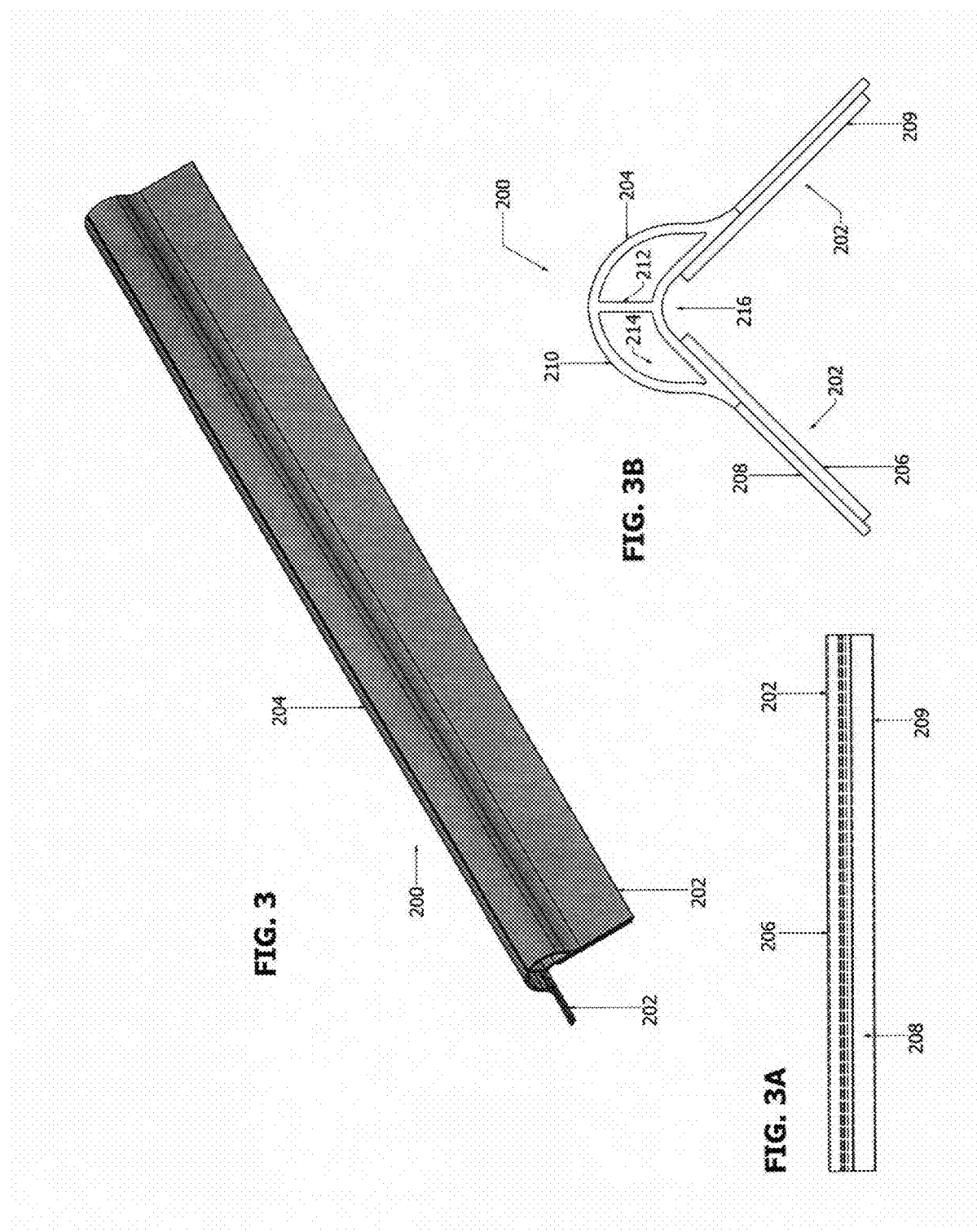

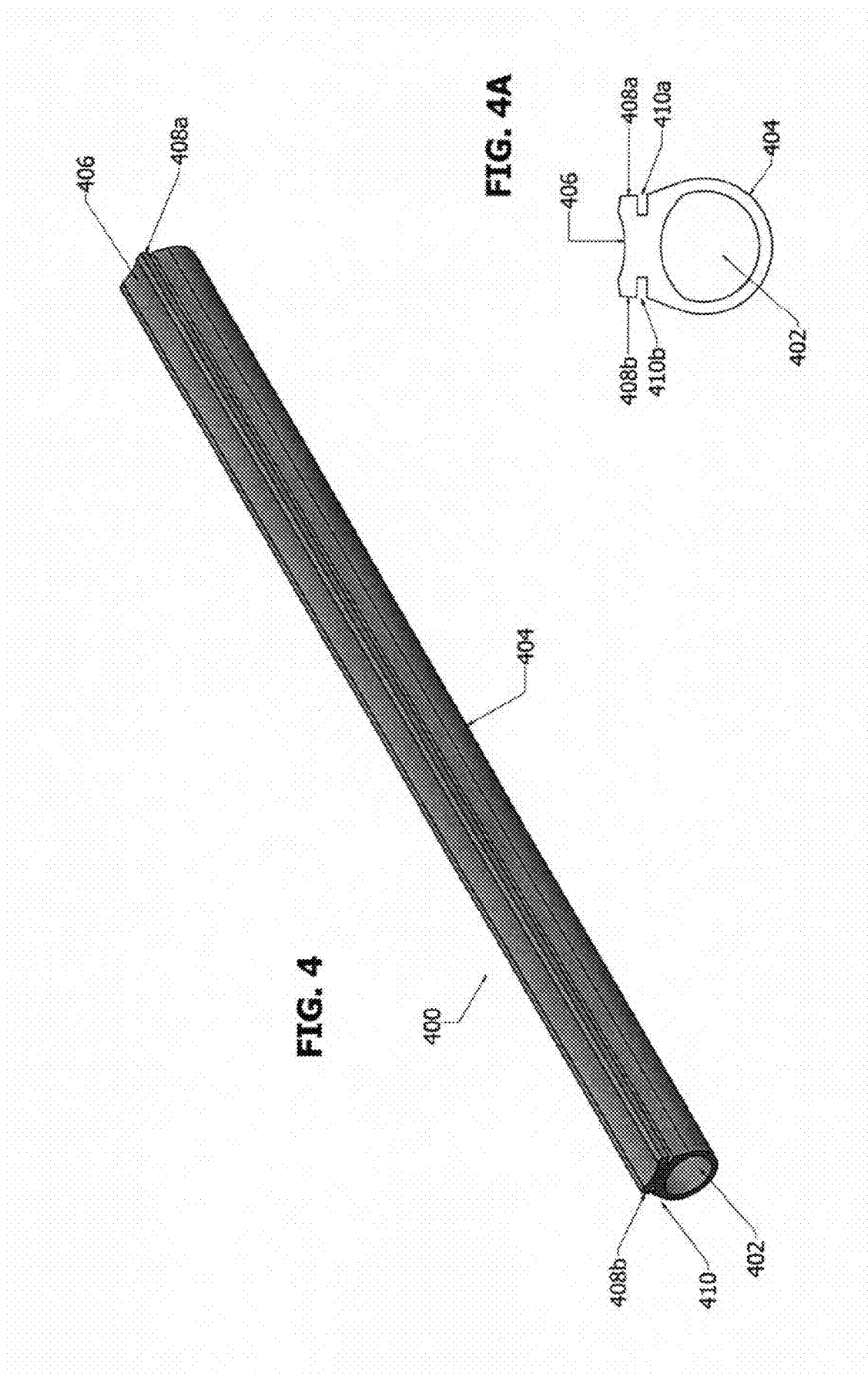

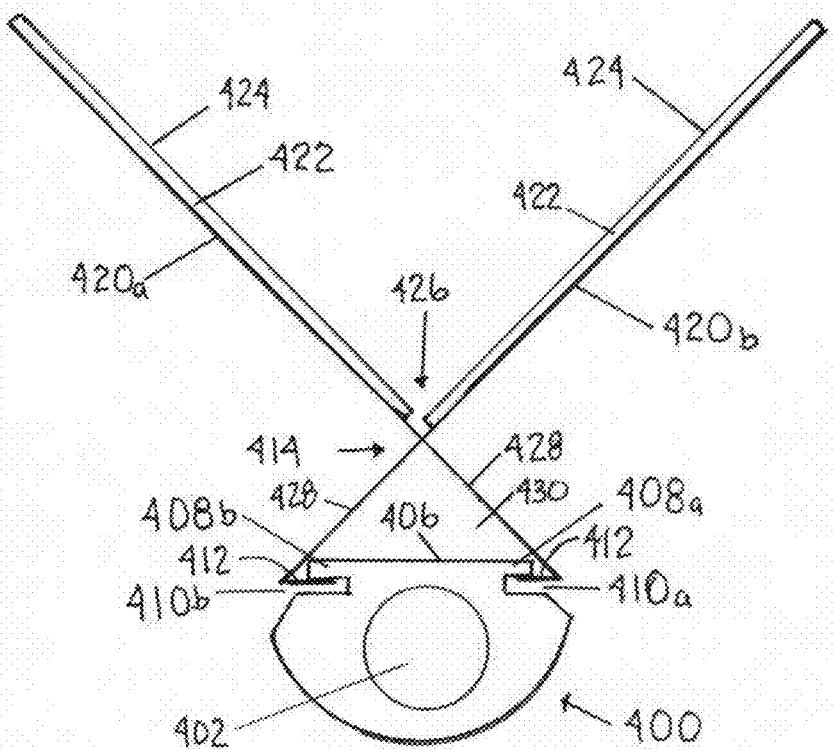

ADJUSTABLE PROTECTION ELEMENT FOR USE WITH LIFTS AND HOISTS

BACKGROUND OF THE INVENTION

1. Field of the Invention

The present invention relates to the field of lifts, hoists and supports for vehicles, especially automobiles and recreational vehicles.

2. Background of the Art

During transportation, repair and storage of vehicles and equipment, systems have been developed that lift and transport vehicles. These devices and systems must be made of sturdy materials capable of supporting heavy vehicles. These sturdy materials are usually metallic, and to simplify manufacture and design, many elements have exposed square edges. These edges have damaged the vehicles during loading and movement, especially when doors of the vehicles are opened.

These systems can be designed to move vehicles for substantial distances and support the vehicles for substantial periods of time. With multiple people attending to the vehicle, it is often possible for the vehicle to be damaged by contact with exposed edges on posts and supports within the system. Doors in particular are subject to damaging contact when opened repeatedly. Among the systems are both portable, single vehicle and multiple vehicle systems as evidenced below.

U.S. Pat. No. 7,726,247 (Neland) describes a dual-use automobile-boat storage pallet, having a structural support framework of generally rectangular shape with first and second side members and a plurality of cross-members. The storage pallet includes an apparatus for holding a boat that is width adjustable and height adjustable and includes a plurality of folding bunks that are mounted on and supported by two or more of the cross-members. The storage pallet includes an apparatus for holding a car, which includes a first automobile tread plate and a second automobile tread plate supported by the first and second side members of the structural support framework. The dual-use automobile storage pallet can include an optional pair of forklift tine guides.

U.S. Pat. No. 5,487,636 (Mkrtchyan) describes a multi-level storage facility comprising a plurality of vertically stacked storage chambers, each of a size to accommodate an item to be stored, such as a vehicle. Each chamber contains a platform, and all of the chambers are accessible from a common face of the facility. An elevator is mounted so as to move along the common face of the facility to provide access to any one of the chambers. Each of the chambers and the elevator provide a device for engaging one of the platforms in an upper or a lower position. The platform being movable between positions at any time including when the elevator is in motion. With the elevator aligned with any one of the chambers, the platform in the chamber may be exchanged with one on the elevator. The elevator provides a device for achieving this result, saving the extreme expense of having exchange devices in each and every chamber, or on each platform.

U.S. Pat. No. 4,307,985 (Desprez) describes an automobile transportation and storage pallet used in automated storage and retrieval systems. The pallet is provided with steel tire channels connected and supported by a plurality of steel support members. Safety grip strips applied to the tire channels provide tire traction thereon. A corrugated drip pan interposed between the tire channels collects any drippings from the automobile. Tire blocks adjustably mounted to the tire channels secure the tires of the automobile resulting in proper alignment of the automobile with respect to the pallet and preventing movement of the automobile thereon. The tire blocks can be adjusted to conform to any size of tire and wheel base. U.S. Pat. Nos. 6,619,620; 5,322,143; 5,116,182; 4,869,634; 3,221,907 and 3,110,466 show additional systems.

U.S. Pat. No. 8,256,577 (Kritzer) discloses a portable automobile lift includes a plurality of portable lifting columns and a portable power unit. Each lifting column includes a column base, a post extending upwardly from the column base, a lifting carriage moveably mounted on a forward side of the post, and a hydraulic actuator connected to the lifting carriage for movement of the lifting carriage along the post. Each column base comprises a respective base plate connected to a lower end of the respective post. The base plate anchor bolt receiving holes extending therethrough for receiving respective anchor bolts. Each column base further includes a pair of wheels positioned to engage a ground surface rearward of the base plate. The lift also includes a portable power unit for providing hydraulic fluid to the actuators. The power unit is mounted on a cart for easy transportation and storage.

U.S. Pat. No. 7,014,012 (Baker) provides a lift system that coordinates the raising and lowering of a vehicle relative to a surface by using wireless communications. The lift system includes at least two lift mechanisms each having a post, a carriage, an actuating device and a control device. The carriage is slidably coupled to the post and is adapted to support a portion of the vehicle. The actuating device is coupled with the carriage and is capable of moving the carriage relative to the post. The control device is coupled with the actuating device and is capable of communicating by wireless signals with the other control device. The control devices communicate by wireless signals to coordinate the movement of the carriages relative to the posts to raise or lower the vehicle. Further, a rechargeable battery may provide power to the control device to allow for increased mobility of the lift system.

All references are included herein by reference in their entirety.

SUMMARY OF THE INVENTION

A protective device is positioned on corners of objects to cushion impact against other surfaces. In particular, the device is placed on and secured (temporarily or permanently) on poles in vehicle lists or hoists. The device may be placed on any corner where impact may occur, as with guideposts in entryways for vehicles such as into garages, into carwashes, entryway to a ferry, and the like. The device preferably has:

two arms having an outer surface and an inner surface;
    each inner surface having a surface for being secured to a distinct surface to avoid contact damage to or from the surface. The inner surfaces are securable to the distinct surface (e.g., a pole or corner) by non-elevated securing means such as a flat head, flush screw, adhesive or magnetic layer;
    inner surfaces of the two arms forming an interior angle between 30 degrees and 150 degrees;
    outer surfaces of the arms forming an exterior angle of between 330 degrees and 210 degrees; and
    the external angle supporting a cushioning element comprising an elastomeric, compressive tube.

BRIEF DESCRIPTION OF THE FIGURES

FIG. 2 is a perspective view of a portable two post automobile lift having a protective element according to the present invention.

FIG. 3 shows a perspective view of one protective element within the scope of the present technology.

FIG. 3A shows a cross-section of an arm of a protective device having a magnetic layer and adhering structural layer with an attachment surface.

FIG. 3B shows a cross-section of a protective element.

FIG. 4 shows a perspective view of an extruded elastomeric cushioning element used in one embodiment of the present technology.

FIG. 4A shows a cross-section view of an extruded elastomeric cushioning element used in one embodiment of the present technology.

FIG. 4B shows a cross-section view of an extruded elastomeric cushioning element nested in a protective corner element used in one embodiment of the present technology.

DETAILED DESCRIPTION OF THE INVENTION

Figure 1:
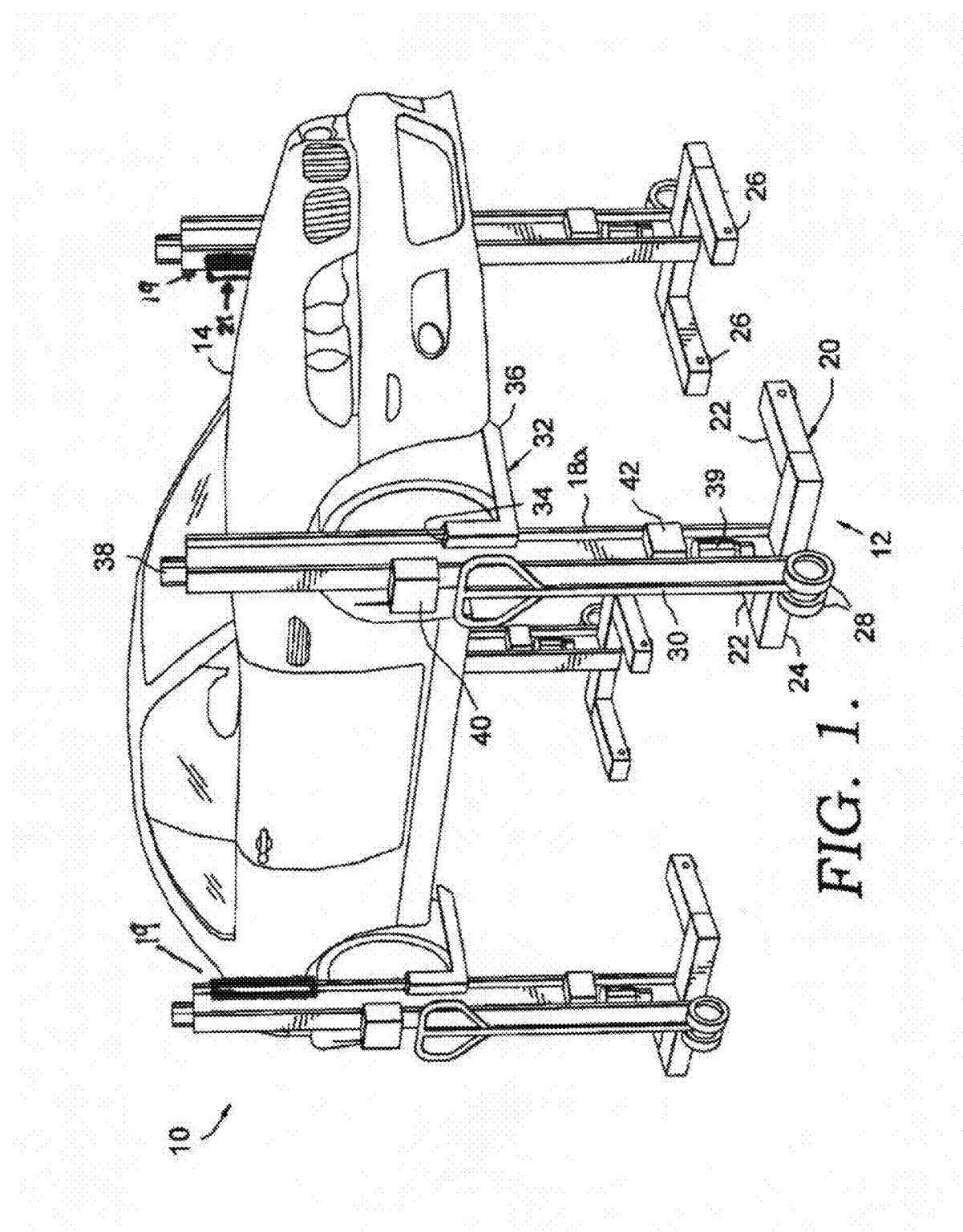
FIG. 1 is a perspective view of an active lift system supporting an automobile.

A protective device is positioned on poles in vehicle lists or hoists. The device has:

two arms having an outer surface and an inner surface;
The inner surfaces are securable to the distinct surface (e.g., a pole or corner) by non-elevated securing means such as a flat head, flush screw, adhesive or magnetic layer. Preferably, each inner surface has a magnetic layer;
inner surfaces of the two arms forming an interior angle between 30 degrees and 150 degrees;
outer surfaces of the arms forming an exterior angle of between 330 degrees and 210 degrees; and
the external angle supporting a cushioning element comprising an elastomeric, compressive tube. The cushioning element, 310 shown in FIG. 3B and 400 shown in FIG. 4B is centered over the exterior angles of supporting devices. The cushioning elements are shown centered to offer direct protection at a corner on which the device is placed. The device may be configured to provide more directed and angular protection over a corner by shifting the compressive tube of the cushioning element off-center so that impacts against the device at angles of than centered towards the center of the exterior angle (e.g., angled 30, 45 or 60 degrees away from a line centered on the exterior angle) can be more directly addressed. The angle shift can be established by the shape and orientation be structured during molding or extrusion so that the cushioning element, when fixed to the corner surface to be protected, will be off center of the angle to be directed towards a direction from which impact can be expected (e.g., direction from which an opened card door may be expected, or if the device is on a corner of a moving door itself, a direction where the door (commercial freezer or commercial refrigerator door might strike an object).

The two arms of the protective device may be independent arms secured to individual panels extending from the cushioning element. The arms may be a magnetic layer on the inner surface and a non-magnetic support layer on the outer surface. The cushioning element may be an elastomeric, compressive, hollow tube having an internal strengthening rib in a diagonal position through the hollow tube. The protective device may have the cushioning element constitute a single extruded elastomeric tube. The cushioning element may have inner surfaces of the two arms forming an interior angle between 30 degrees and 150 degrees, preferably between 60 and 120 degrees, more preferably between 80 and 100 degrees and approximately 90 degrees. Flexibility of the joining area between the two arms can allow for the protective device to adjust to non-linearity, structural variation and different corner angles on the poles or posts adjacent to the hoist or lift.

As described in greater detail herein, the magnetic layer may be an elastomeric material having magnetic particles dispersed therein. The magnetic layer should provide a force of attachment to a smooth iron surface of at least 3, 4 or 5 pounds per square inch. The magnetic layer may be an elastomeric material having magnetic particles dispersed therein and the magnetic layer provides a force of attachment to a smooth iron surface preferably of at least 5 pounds per square inch.

A less preferred protective device may have a different construction wherein:

two arms having an outer surface and an inner surface and forming a length;
each inner surface having a magnetic layer;
inner surfaces of the two arms forming an interior angle of approximately 90 degrees;
outer surfaces of the arms forming an exterior angle of about 90 degrees; and
the external angle supporting a cushioning element comprising an elastomeric, compressive tube. The format of protective device may have the two arms as metallic and the outer surfaces of the arms provide a track into which the cushioning element can be slid along the length of the arms to be secured to the outer surfaces of the arms. Again, the cushioning element comprises a single extruded elastomeric tube. The length and width of the arms may be determined by the length or area that is to be provided with impacting protection, and may be from a few centimeters (e.g., 5 cm length and width) up to meters in length and width (e.g., 1 to 15 meters in length and 0.1 to 3 meters in width, typically).

Reference to the figures will provide a greater understanding of the present technology. According to FIG. 1, numeral 10 generally designates a lift system constructed in accordance with a first preferred embodiment of the present invention. Generally, lift system 10 includes four lift mechanisms 12 that communicate by wireless signals to coordinate the movement of a vehicle 14 relative to a surface. It will be understood and appreciated that the number of lift mechanisms 12 used in the present invention may vary depending on the type of vehicle being lifted. For instance, six lift mechanisms may be used to lift a three axle vehicle for service. Furthermore, it will be understood that lift system 10 is not limited for use with vehicles, but also may be used to raise or lower other objects relative to the surface.

Each lift mechanism 12 includes an upstanding post 18 supported by a base 20. Base 20 includes a pair of flanges 22 that are coupled to one another by a cross piece 24. A pair of front wheels 26 are rotatably coupled with an end portion of flanges 22. Further, a pair of rear wheels 28 are rotatably coupled adjacent to cross piece 24. Wheels 26, 28 are adapted to allow lift mechanism 12 to be rolled along the surface and placed in a position to support vehicle 14. A handle 30 is coupled to wheels 26, 28 and may be moved about a pivot point established adjacent to wheels 28. Handle 30 may be used to place wheels 26, 28 in contact with the surface so that lift mechanism 12 may be rolled into position. Once lift mechanism 12 is in position, handle 30 may then be used to raise wheels 26, 28 so that they are no longer in contact with the surface. The lift mechanism is thereby placed in a stable position for raising and lowering vehicle 14.

Post 18*a* is mounted to cross piece 24 and extends upwardly from the surface. Lifting mechanism 12 also includes a carriage 32 that is slidably coupled to post 18*a*. Specifically, carriage 32 includes a slot portion 34 that engages a portion of post 18*a* to enable carriage 32 to move longitudinally with respect to post 18*a*. Carriage 32 further includes a pair of forks 36 that extend outwardly from slot portion 34 and are adapted to support a portion of vehicle 14. In particular, forks 36 are adapted to support vehicle 14 at each wheel, but it will be understood that carriage 32 may also be adapted to support the frame or any other portion of vehicle 14.

Carriage 32 may be moved relative to post 18*a* using a piston and cylinder assembly 38. The piston may be secured to post 18*a* and/or base 20 in a generally upright position. The cylinder is coupled to carriage 32 in such a way that the cylinder and carriage 32 move upwardly or downwardly in conjunction with one another. Generally, a power unit is used to move a fluid into the cylinder in such a manner to cause piston to rise and will be described in further detail below. The movement of the piston causes carriage 32 move upwardly relative to the surface. As fluid is removed from the cylinder, the piston moves downwardly and carriage 32 is lowered through the use of gravity. It will be understood that piston and cylinder assembly 38 may operate to move carriage 32 through the use of either hydraulic or pneumatic forces. Further, it is also within the scope of this invention to use a double acting cylinder to move carriage 32 relative to post 18*a*.

As best seen in FIG. 1, each lift mechanism 12 also includes a control box 40 that is adapted to communicate with the other control boxes in lift system 10 by wireless signals to coordinate the raising and/or lifting of vehicle 14. With additional reference to FIG. 1, a rechargeable battery 42, or other power source, may provide power to control box 40 by selectively activating a power switch. An antenna may be coupled to each control box 40 to enhance the quality of the wireless communication between the control boxes. Furthermore, control box 40 may include a transceiver, not shown, that is capable of sending and receiving wireless communications to and from other control boxes in lift system 10.

Control box 40 provides for a number of input components. One input component may be a height sensing mechanism which is adapted to determine the height of carriage 32 relative to the surface and relay that information back to control box 40. It should be understood that height sensing mechanism (not shown) may be separate from and positioned in a different location relative to control box 40. Other input components include an emergency stop button, an interlock function, a selector switch and a motion switch. An emergency stop button allows a user to instruct control box 40 to stop moving carriage 32 relative to post 18*a*. An interlock function should be engaged before lifting or lowering of carriage 32 can occur. When lift system 10 is in a synchronized mode, interlock function also allows a user to specify which one of the control boxes will be the master control box. Once a master control box is selected, the remaining control boxes are designated as slave control boxes and operate under instructions provided by the master control box. A more detailed discussion of the coordinated operation of lift mechanism 12 will be provided below. Selector switches allow control box 40 to be changed between independent and synchronized modes, which will also be discussed in more detail below. Remote control devices may communicate with control box 40 to initiate some input devices from a location that is remote from lift mechanism 12. It will be appreciated that it is also within the scope of this invention to provide for other input devices such as, but not limited to, a level sensor that is adapted to determine the position of post 18*a* relative to a vertical axis.

Control box 40 also provides for output components. These output device may include power unit 39, a lowering valve solenoid, a holding valve solenoid, a safety release solenoid, etc.

In operation, one or more lift mechanisms 12 are first placed in a position to support a portion of vehicle 14. In particular, forks 36 are placed on opposite sides of the tire in a support position. In order to provide a mobile and convenient lift system, each of the lift mechanisms 12 may be powered by rechargeable battery 42. Specifically, the energy stored in the battery may provide the power required for the operation of the lift mechanism, including the control box. The battery may be replenished during the operation of lift mechanism 12, or while lift mechanism 12 are not in use.

Each lift mechanism 12 provides for a dual mode of operation, specifically, an independent mode and a synchronized mode. The independent mode allows each lift mechanism to operate independent of one another to raise or lower each of their carriages relative to the surface by inputs received at each of their separate control boxes.

As previously stated, the lift system 10 may also be placed in a synchronized mode. The synchronized mode allows input commands at one control box to influence other control boxes within the system to provide a coordinated lift of vehicle 14. The synchronized mode begins in a similar fashion as in the independent mode.

Referring to the drawings in more detail, and in particular to FIG. 2, the reference number 1 generally designates a portable two post lift with two displayed protective elements 19 according to the present invention. The lift 1 generally includes two portable lifting columns 3, a power unit 5 and flow divider 7 mounted on a cart 9, and a pair of quick disconnect hoses 11. Each lifting column 3 includes a post 13 extending upwardly from a column base 15, and a lifting carriage 17 vertically moveable along the post 13. Mounted on each lifting carriage 17 and extending outwardly therefrom are a pair of arms 18 for engaging an undercarriage of a vehicle (not shown). The column bases 15 are adapted to be bolted to a ground surface, such as a concrete slab, when the lift 1 is in use, and to be unbolted from the ground surface when the lift is not in use so that the lifting columns 3 can be moved to storage.

The protective element 19 has arms or flanges 23 that are secured to the sides of the post 13. There is a cushioning segment 21 extending out near a corner of the post 13, here shown as a right angle.

Referring to FIG. 2, the post 13 of each lifting column 3 is generally rectangular in cross section. The front of the post 13 includes a pair of narrow support arms 18. The lifting carriage 17 of each lifting column 3 extends through the post 13. A protective element 19 is shown on the post 13. The protective element 19 has extended arms 23 and a cushioning volume 21 approximately at a corner of the post 13. The cushioning volume 21 need not be precisely at a corner, but may extend completely onto one side, especially where that is a position where car doors are likely to contact the posts 13.

The lifting carriage 17 further includes arms 18 are mounted thereon. Each arm 18 includes a telescoping or otherwise adjustable arm section 81.

Means for engaging the undercarriage of a vehicle (not shown), such as lifting pads (not shown) rotatably received in pad receivers 81 which are provided on the distal end of the arms 18 proximate the distal ends thereof.

Each column base 15 further includes a pair of wheels 93 mounted rearwardly of a rear edge of the column base 15. Each wheel 93 rotates about a respective axle. The wheels 93 are positioned to rollingly engage a ground surface when the bottom surface of the column base 15 is in abutment against the ground surface. Further, since the wheels are positioned rearwardly of the column base 15, the respective lifting column 3 can be tilted rearwardly on the wheels 93 to bring the respective column base 15 off of the ground surface, allowing the lifting column 3 to be rolled across the ground surface on the wheels 93.

Each lifting column 3 is provided with a handle 100 positionable near the top of the respective post 13 to facilitate tilting and rolling the lifting column 13. Each handle 100 generally comprises a bar 101 extending through the side walls near the top of the respective post 13. When the lift 1 is in use, the handles 100 also serve as safety lock bars to prevent inadvertent lowering of the lifting carriages 17. In order to prevent the lifting carriages from being lowered or falling from their fully raised positions, the handles 100 may each be inserted with the respective bar 101 extending through the side walls, which are positioned immediately below the lifting carriages 17 when the lifting carriages 17 are in their fully raised position. Similarly, if the carriages 17 are only partly raised, the handles 100 may each be inserted with the respective bar 101.

Hydraulic power for the lifting columns 3 is provided by the power unit 5, which is mounted on the cart 9. The power unit 5 includes a motor 105, such as an AC electric motor, which drives a hydraulic pump 107 which circulates hydraulic fluid from a reservoir 109. From the pump 107, fluid flows to the flow divider 7 which directs flow to the two lifting columns 3. The flow divider 7 is preferably a rotary gear flow divider adapted to provide synchronized movement of the two lifting columns 3 even if uneven weight acts on the lifting columns 3 results in unequally loading. The cart 9 further includes wheels 111 and grips 113 for easy portability of the cart 9.

The flow divider 7 includes first and second quick disconnect fittings 115 and 117 each of which receives a first end of a respective one of the quick disconnect hoses 11. The second end of each hose 11 is connected to a respective quick disconnect fitting 119 located on the post 13 of a respective one of the lifting columns 3.

The lift 1 is easily removed from the work area for storage by disconnecting the power unit 5, removing the arms 18, and removing the anchor bolts attaching the lifting columns 3 to the slab. The cart 9 and lifting columns 3 can then be rolled to a storage location on the associated wheels 93 and 111. Because of the relatively small size of the column bases 15, minimal storage space is required. It should be noted that the anchors remain installed in the concrete slab, so that on the second and succeeding installation of the lift 1, no drilling is required. The lifting columns 3 are simply positioned over the existing holes in the slab, and the anchor bolts installed.

As disclosed herein, the lift 1 is well adapted as a medium rise lift having a lifting height of approximately 45 inches and a column height that increases from a minimum of 64 inches to a maximum of 89 inches as the carriages 17 are raised. As such, the lift 1 is ideally suited for use in a residential garage or the like having a ceiling height as low as eight feet (96 inches).

FIG. 3 shows a perspective view of one protective element 200 within the scope of the present technology. The protective element 200 is shown with the two arms 202 and the cushioning segment 204.

FIG. 3A shows a cross-section of an arm 202 having a magnetic layer 206 and adhering structural layer 208 with an attachment surface 209.

FIG. 3B shows a cross-section of a protective element 200. The two arms 202 with their respective magnetic layer 206 and adhered structural layer 208 with an attachment surface 209 are shown. The cushioning segment 204 is shown with its preferred construction. The cushioning segment 204 is shown as a unitary, extruded element that has a top layer 210, internal, gas-filled cushioning volume 214 and a reinforcing stem 212 that reduces non-elastic collapse of the cushioning volume 214. When the reinforcing element is positioned over a corner of a post or brace (not shown) with the internal angle 216 of the protective element 200 over the angle, the respective magnetic layers 206 affix the attachment surface to sides of the metallic post (not shown) at a height on the post convenient to minimize damage. This is a simple method of retrofitting posts to avoid impact damage to vehicles without significant expense.

The magnetic layer 206 may be composed of magnetic film adhered (e.g., by adhesive) to the structural layer 208 or a polymeric or elastomeric film containing a concentration of magnetic particles (e.g., magnetic particles in natural or synthetic rubber, silicone elastomer, polybutadiene-styrene elastomer, polyurethane elastomer, and the like. Ferromagnetic and ferrimagnetic materials are preferred because of their low cost. The concentration and strength of the magnetic materials should be sufficient to provide a strength of attachment to a smooth iron surface of at least 5 pounds per square inch, more preferably at least 10, 15, 20 or 30 pounds per square inch, and even 40 or 50 pounds per square inch. The protective device may be removed from the post manually or using a prying tool to lift an edge to assist in removing the protective device.

Another construction for the protective device of the present technology may have a readily replaceable cushioning element that is slid into place on a more rigid, one-piece, angled corner-fitting support. The one-piece, angled corner-fitting support may be an approximately right angle frame, where the interior of the right angle fits over the corner of a post and the replaceable cushioning element is affixed to the exterior side of the right angle. FIG. 4 shows a perspective view of a replaceable (insertable) cushioning element 400. The insertable cushioning element 400 is a single piece, extruded rubbery tube 404 having a top engaging surface 406 (shown with a slight curve to assist in conforming to the frame), a hollow volume 402 to provide flexibility and compressibility. The top engaging surface 406 is bordered by two extensions 408a and 408b that are inserted into a glide receiver (not shown) on the outside of the right angle of the one-piece, angled corner-fitting support (not shown). Below the two extensions 408a and 408b are receptor slots 410 (in FIG. 4) and 410a and 410b (in FIG. 4A).

FIG. 4A shows a cross-section view of an extruded elastomeric cushioning element 400 nested in a protective corner element 414 used in one embodiment of the present technology. The extruded elastomeric cushioning element 400 is substantially the same as that in FIG. 4B except that the surface 406 is shown as flat. The cushioning element 400 is nested within the gripping extensions 412 inserted into the receptor slots 410a and 410b. The protective corner element 414 shown has two major arms 420a and 420b at an approximately 90 degree angle 426. The inner surfaces 424 of the two major arms 420*a* and 420*b* are shown with rigid or cushioning, elastomeric magnetic sheets 422 to be used for adhering the elastomeric cushioning element 400 to a post (not shown) in a lift or hoist as in FIGS. 1 and 2. The two extensions 408*a* and 408*b* are within the volume 430 between the extended arms 428 and above the gripping extensions 412 and into the receptor slots 410*a* and 410*b*. All same numbers in the Figures refer to same elements.

Variations and alternatives within the scope of the generic technology described herein can be practiced by the ordinary skilled artisan without avoiding the scope of the following claims. For examples, dimensions, structural materials and shapes may be varied.

What is claimed:

1. A protective device comprising:
    two arms having an outer surface and an inner surface;
    each inner surface having a magnetic layer;
    inner surfaces of the two arms forming an interior angle between 30 degrees and 150 degrees;
    outer surfaces of the arms forming an exterior angle of between 330 degrees and 210 degrees; and
    the external angle supporting a cushioning element comprising an elastomeric, compressive tube, wherein the two arms are independent arms secured to individual panels extending from the cushioning element, the arms comprise a magnetic layer on the inner surface and a non-magnetic support layer on the outer surface, and the cushioning element comprises an elastomeric, compressive, hollow tube having an internal strengthening rib in a diagonal position through the hollow tube.

2. The protective device of claim 1 wherein the cushioning element comprises a single extruded elastomeric tube.

3. The protective device of claim 2 wherein the cushioning element has inner surfaces of the two arms forming an interior angle between 60 degrees and 120 degrees.

4. The protective device of claim 1 wherein the magnetic layer comprises an elastomeric material having magnetic particles dispersed therein.

5. The protective device of claim 4 wherein the magnetic layer provides a force of attachment to a smooth iron surface of at least 5 pounds per square inch.

6. The protective device of claim 1 wherein the magnetic layer comprises an elastomeric material having magnetic particles dispersed therein and the magnetic layer provides a force of attachment to a smooth iron surface of at least 5 pounds per square inch.

7. A protective device comprising:
    two arms having an outer surface and an inner surface;
    each inner surface having a magnetic layer;
    inner surfaces of the two arms forming an interior angle between 30 degrees and 150 degrees;
    outer surfaces of the arms forming an exterior angle of between 330 degrees and 210 degrees; and
    the external angle supporting a cushioning element comprising an elastomeric, compressive tube, wherein the two arms are independent arms secured to individual panels extending from the cushioning element, wherein the cushioning element comprises an elastomeric, compressive, hollow tube having an internal strengthening rib in a diagonal position through the hollow tube.

8. The protective device of claim 7 wherein the cushioning element comprises a single extruded elastomeric tube.

9. The protective device of claim 8 wherein the cushioning element has inner surfaces of the two arms forming an interior angle between 60 degrees and 120 degrees.

10. The protective device of claim 9 wherein the magnetic layer comprises an elastomeric material having magnetic particles dispersed therein and the magnetic layer provides a force of attachment to a smooth iron surface of at least 5 pounds per square inch.

11. The protective device of claim 7 wherein the cushioning element has inner surfaces of the two arms forming an interior angle between 30 degrees and 150 degrees.

12. The protective device of claim 7 wherein the magnetic layer comprises an elastomeric material having magnetic particles dispersed therein and the magnetic layer provides a force of attachment to a smooth iron surface of at least 5 pounds per square inch.

13. A protective device comprising:
    two arms having an outer surface and an inner surface;
    each inner surface having a magnetic layer;
    inner surfaces of the two arms forming an interior angle between 30 degrees and 150 degrees;
    outer surfaces of the arms forming an exterior angle of between 330 degrees and 210 degrees; and
    the external angle supporting a cushioning element comprising an elastomeric, compressive tube, wherein the two arms are independent arms secured to individual panels extending from the cushioning element, wherein the cushioning element comprises a single extruded elastomeric tube.

14. The protective device of claim 13 wherein the cushioning element has inner surfaces of the two arms forming an interior angle between 60 degrees and 120 degrees.

15. A protective device comprising:
    two arms having an outer surface and an inner surface and forming a length;
    each inner surface having a magnetic layer;
    inner surfaces of the two arms forming an interior angle of approximately 90 degrees;
    outer surfaces of the arms forming an exterior angle of about 90 degrees; and
    the external angle supporting a cushioning element comprising an elastomeric, compressive tube, wherein the two arms are metallic and the outer surfaces of the arms provide a track into which the cushioning element can be slid along the length of the arms to be secured to the outer surfaces of the arms.

16. The protective device of claim 15 wherein the cushioning element comprises a single extruded elastomeric tube.

* * * * *